US008525360B2

(12) United States Patent  (10) Patent No.: US 8,525,360 B2
Ono  (45) Date of Patent: Sep. 3, 2013

(54) APPARATUS FOR GENERATING ELECTRIC POWER

(75) Inventor: Hiroaki Ono, Kanazawa (JP)

(73) Assignee: Linear Circuit Inc., Ishikawa (JP)

( * ) Notice: Subject to any disclaimer, the term of this patent is extended or adjusted under 35 U.S.C. 154(b) by 197 days.

(21) Appl. No.: 13/114,313

(22) Filed: May 24, 2011

(65) Prior Publication Data

US 2011/0291418 A1   Dec. 1, 2011

(30) Foreign Application Priority Data

May 27, 2010 (JP) ................................ 2010-121755

(51) Int. Cl.
*F03B 13/00* (2006.01)

(52) U.S. Cl.
USPC ............................................. 290/42; 290/53

(58) Field of Classification Search
USPC ...................................... 290/42, 53
See application file for complete search history.

(56) References Cited

U.S. PATENT DOCUMENTS

| 3,204,110 | A | * | 8/1965 | Masuda | 290/42 |
| 4,266,143 | A | * | 5/1981 | Ng | 290/53 |
| 4,423,334 | A | | 12/1983 | Jacobi et al. | |
| 4,748,338 | A | * | 5/1988 | Boyce | 290/42 |
| 7,649,276 | B2 | * | 1/2010 | Kornbluh et al. | 290/53 |
| 7,989,975 | B2 | * | 8/2011 | Clement et al. | 290/53 |
| 8,013,462 | B2 | * | 9/2011 | Protter et al. | 290/53 |
| 2006/0232074 | A1 | * | 10/2006 | Chiasson | 290/53 |
| 2008/0093858 | A1 | | 4/2008 | Hench | |

FOREIGN PATENT DOCUMENTS

| FR | 2 916 021 | 11/2008 |
| GB | 2464482 | 4/2010 |
| JP | 57-91380 | * 6/1982 |
| JP | 2005-69212 | 3/2005 |
| WO | 2008/119881 | 10/2008 |

OTHER PUBLICATIONS

Extended European Search Report issued Sep. 26, 2011 in corresponding European Application No. 11 00 4309.
Tomiji Watanabe, "Wave-Power Generation Proceeding to Practical Use (Interesting Utilization of Ocean Energy)", Powersha Inc., May 25, 2009, pp. 34-57 (with partial English translation).

* cited by examiner

*Primary Examiner* — Tho D Ta
(74) *Attorney, Agent, or Firm* — Wenderoth, Lind, Ponack, L.L.P.

(57) ABSTRACT

A power generator that can be utilized as a small facility of low capacitance. The power generator comprises a float that is placed on a surface of the sea, supporting members mounted on the float, and a movable member supported by the supporting members and can be movable by the swing motion of the float caused by waves.

9 Claims, 14 Drawing Sheets

APPARATUS FOR GENERATING ELECTRIC POWER

BACKGROUND OF THE INVENTION

1. Field of the Invention

The present invention relates to a power generator that floats on the surface of the sea or the like to generate electric power using waves.

2. Description of the Related Art

The technology of generating electric power with use of the energy of waves emerging on the surface of the sea is known as so-called wave power generation.

In the wave power generation technology, there is a swinging plate system in which a swinging plate is hung in a water chamber open to the travel direction of waves so as to be swung forward and backward with the use of standing waves emerging in the water chamber.

This system achieves high power generation efficiency because kinetic energy and potential energy of waves can be entirely and efficiently transduced to electric energy (for example, "Wave power generation for practical application", Tomiji WATABE, POWERSHA Inc., May 25, 2009, pp. 34-57).

The power generation efficiency can be further improved by adopting a floating water chamber and suppressing the swinging motion of the water chamber itself caused by waves (JP-A-2005-69212).

In this conventional technology, the swinging plate system achieves excellent power generation efficiency and is suitable for power generation of high capacitance. However, this system requires large equipment as a whole and is therefore not quite applicable as a facility of low capacitance.

SUMMARY OF THE INVENTION

In view of the above problem in the conventional technology, it is an object of the present invention to provide a power generator that includes a movable member on a float and a supporting member interposed therebetween so as to be preferably utilized as a small facility of low capacitance.

In accordance with an aspect of the present invention, a power generator comprising a base member, a supporting member mounted on the base member, a movable member supported by the supporting member to move in association with the base member; and a power generation unit for generating electric power with use of the motion of the movable member.

The base member is preferably a float that is placed on a surface of the sea.

The movable member is preferably a spherical body that has a dislocated center of gravity, a vibrating member that reciprocatingly vibrates within a vertical plane, a swinging member that reciprocatingly swings within a vertical plane or a rotating member that rotates within a horizontal plane.

In the configurations according to the present invention, when the base member is mounted on an arbitrary structural body that can serve as a vibration source or a swing source, the base member causes the movable member mounted thereon to move in accordance with the vibrating motion or the swinging motion of the structural body. The power generation unit is capable of generating electric power with use of the motion of the movable member. The motion of the movable member contributing to the power generation may occur partially or entirely in the movable member. More specifically, only part of the movable member may move relatively to the supporting member, or the entire movable member may move relatively thereto. The power generation unit may be of any arbitrary type as long as being capable of detecting energy of the relative motion of the movable member and transducing the detected energy into electric energy.

In the case where the base member is provided as the float on the surface of the sea, the float is randomly swung upward, downward, rightward, and leftward by waves to move the movable member on the float and thereby to cause the power generation unit to generate electric power.

The movable member provided as the spherical body is capable of rotating as a whole reciprocatingly in arbitrary directions. Accordingly, such a movable member is applicable preferably and widely to the random swinging motion of the float caused by waves. The supporting member for supporting the spherical body may be configured by a biaxial gimbal mechanism, three or more supporting rollers or three or more supporting balls that are each shiftable in the axial direction, a spherical bearing of a sliding type or a ball type applicable to the outer diameter of the spherical body, or the like, in order to allow the spherical body to rotate in the arbitrary directions.

The movable member provided as the vibrating member that reciprocatingly vibrates within a vertical plane or the swinging member that reciprocatingly swings within a vertical plane is particularly preferable as being applicable to the upward and downward swinging motion of the float caused by waves. Moreover, the movable member provided as the vibrating member or the swinging member is advantageous in that the support structure configured by the supporting member can be embodied in a simple manner.

The rotating member for rotating within a horizontal plane easily achieves a compact connection structure with a dynamo of the power generation unit, and the power generation unit can be easily accommodated within the float. In this case, the rotating member has the center of gravity sufficiently dislocated from a rotary shaft of the supporting member so as to be smoothly rotated by the swinging motion of the float.

DETAILED DESCRIPTION OF THE PREFERRED EMBODIMENTS

Embodiments of the present invention are described below with reference to the drawings.

Figure 1A:
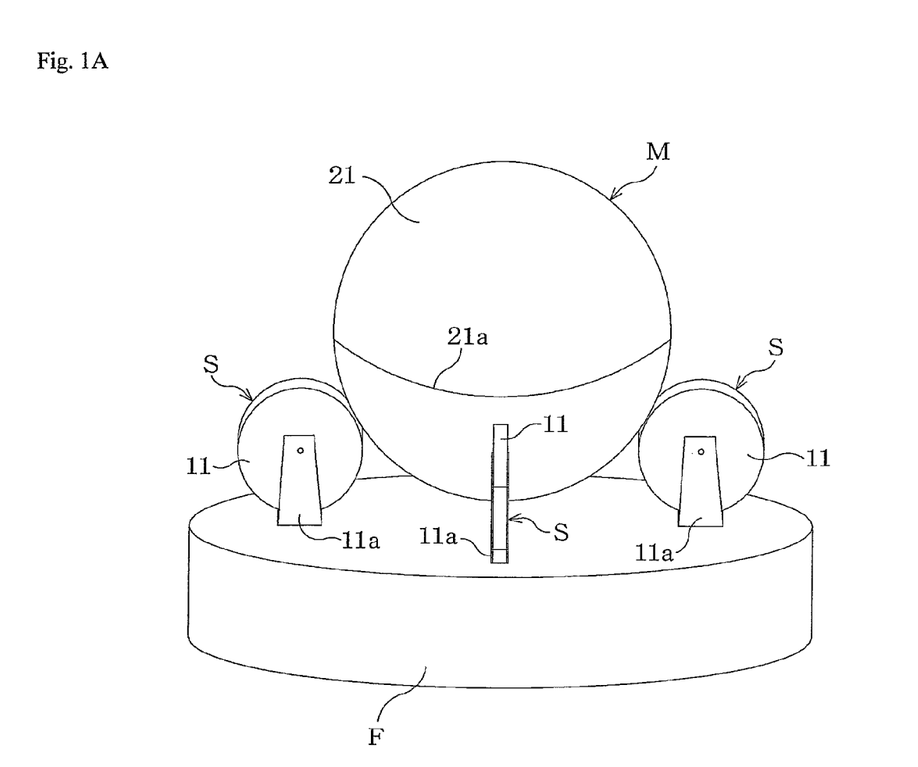
FIGS. 1A and 1B are first explanatory views each showing an entire structure.
Figure 1B:
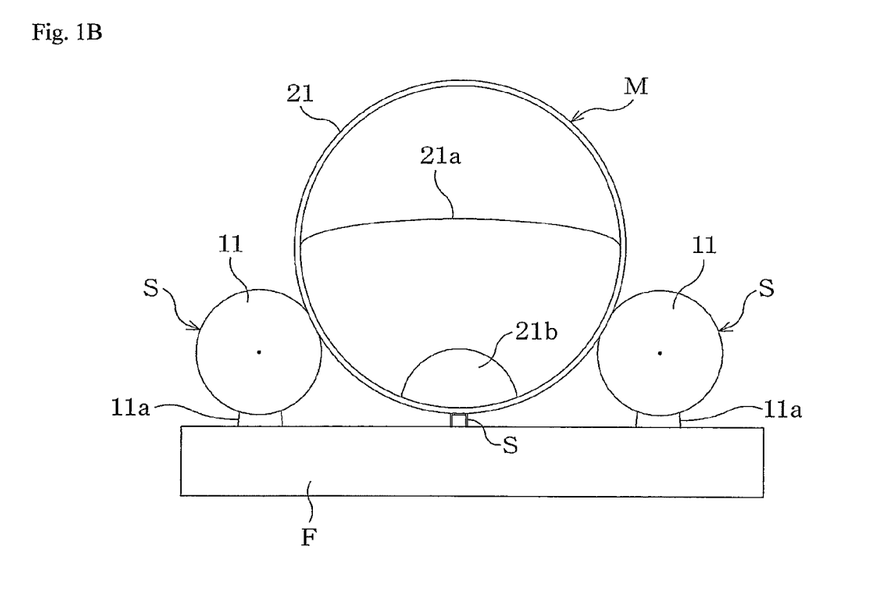

A power generator includes a float F, supporting members S, S, and a movable member M that is mounted on the float F with the supporting members S, S, . . . being interposed therebetween (FIGS. 1A and 1B). FIG. 1A is a schematic perspective view of an entire structure, and FIG. 1B is a vertical sectional view at the center of the entire structure.

The float F is formed in the shape of a circular flat plate and can be floated on the surface of the sea. Provided on the float F are the four supporting members S, S, . . . that are arranged to form a cross shape. Each of the supporting members S includes a bracket 11a standing on the float F and a supporting roller 11 rotatably attached to the bracket 11a.

The movable member M is formed as a hollow spherical body 21. The spherical body 21 can be separated into an upper portion and a lower portion at a central joint portion 21a. The spherical body 21 has a weight 21b secured to the inside thereof. Accordingly, the weight 21b largely dislocates the center of gravity of the spherical body 21 from the center of the spherical body 21.

The movable member M is supported by the supporting rollers 11, 11, . . . of the supporting members S, S, . . . . When the float F is placed on the surface of the sea and is randomly swung upward, downward, rightward, and leftward by waves, the swinging motion of the float F rotates the movable member M randomly and reciprocatingly in arbitrary directions to rotate some or all of the supporting rollers 11, 11, . . . . Therefore, if a power generation unit including a dynamo (not shown) is connected to a shaft of each of the supporting rollers 11, the motion of the movable member M can be extracted as electric energy.

The supporting roller 11 of each of the supporting members S is preferably shiftable in the axial direction so as to allow the movable member M to rotate in the arbitrary directions. In this case, each of the supporting rollers 11 is provided with a bias member that biases the supporting roller 11 so as to return to the central neutral position in accordance with the amount of shift in the axial direction. Accordingly restricted is the horizontal component in the rotation of the movable member M, so that the movable member M can move more smoothly.

Other Embodiments

Figure 2A:
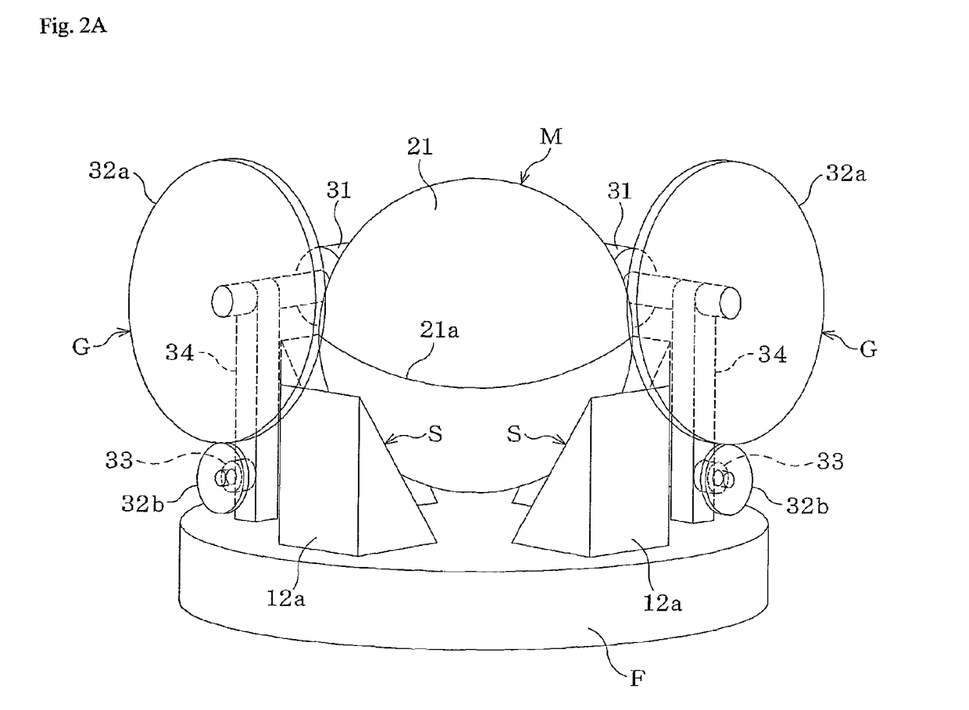
FIGS. 2A and 2B are second explanatory views each showing an entire structure.
Figure 2B:
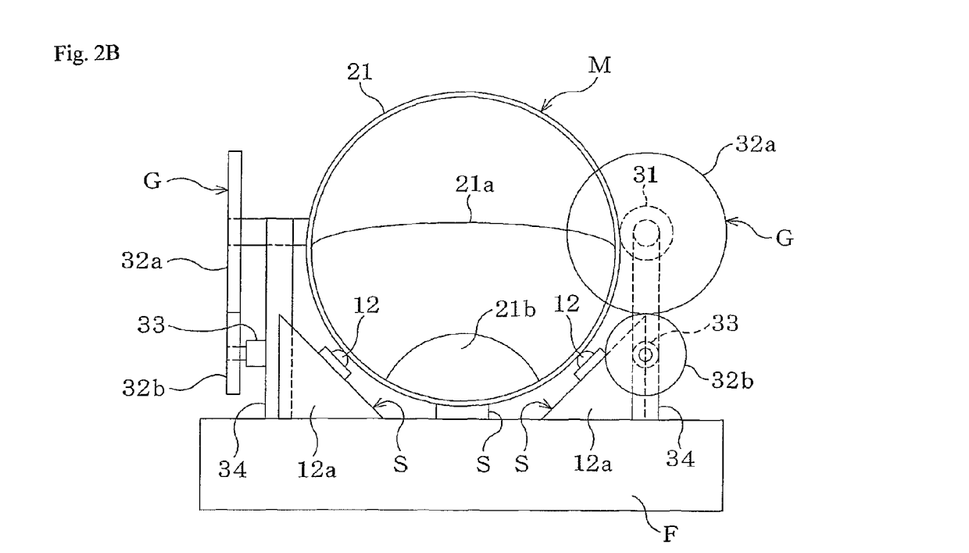

The four supporting members S, S, . . . , which rotatably support the movable member M provided as the spherical body 21, may each include a stand 12a having a triangular pyramid shape and a supporting ball 12 that is rotatably mounted on the bevel of the stand 12a (FIGS. 2A and 2B). Similarly to FIGS. 1A and 1B, FIGS. 2A and 2B are a schematic perspective view of an entire structure, and a vertical sectional view at the center of the entire structure, respectively.

In FIGS. 2A and 2B, the rotation in an arbitrary direction of the movable member M provided as the spherical body 21 is extracted as electric energy by two power generation units G, G that are disposed in the directions perpendicular to each other. The power generation units G, G each include a roller 31 that rotates while being in contact with the surface of the movable member M, large and small gears 32a and 32b, and a dynamo 33 that is connected to the roller 31 by way of the gears 32a and 32b. The power generation units G, G are supported respectively by support poles 34, 34 that stand on the float F. Each of the rollers 31 is in contact with the surface of the spherical body 21 at a position higher than the joint portion 21a located at the center of the spherical body 21, so that the spherical body 21 is stably retained on the supporting members S, S, . . . . Moreover, each of the rollers 31 is preferably shiftable in the axial direction, similarly to the supporting rollers 11 of the supporting members S, S, . . . illustrated in FIGS. 1A and 1B.

Figure 3A:
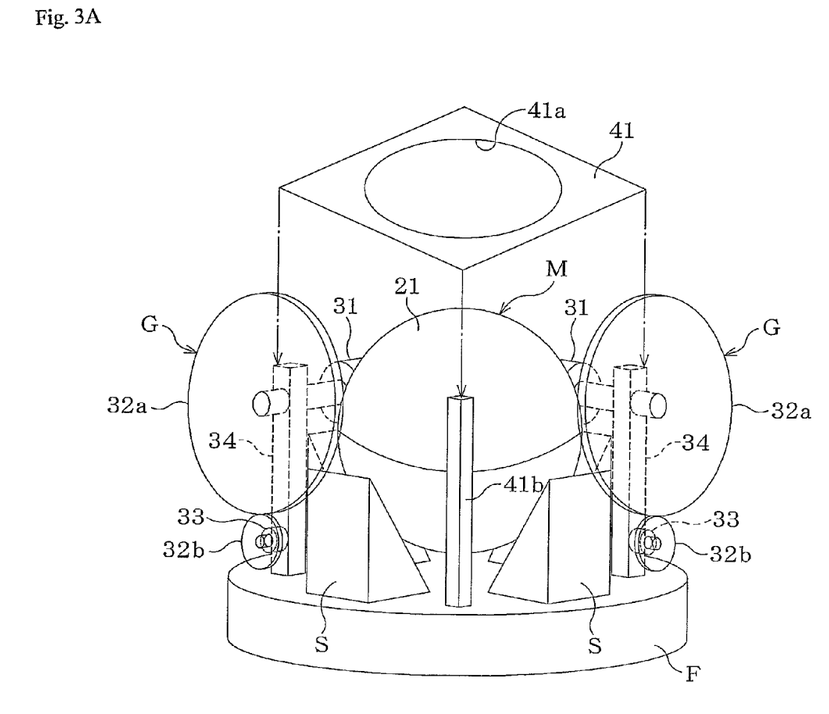
FIGS. 3A and 3B are third explanatory views each showing an entire structure.
Figure 3B:
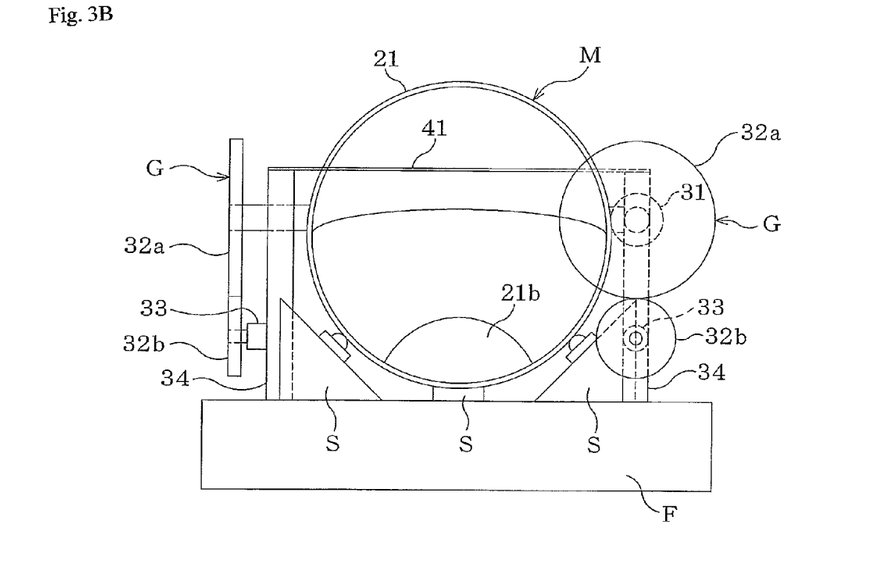

There may be mounted a guard 41 to the movable member M provided as the spherical body 21 in FIGS. 2A and 2B (FIGS. 3A and 3B). Similarly to FIGS. 1A and 1B, FIGS. 3A and 3B are a schematic perspective view of an entire structure, and a vertical sectional view at the center of the entire structure, respectively.

The guard 41 is a member in a flat plate shape and is provided in the center thereof with a circular opening 41a. The guard 41 is secured at an appropriate height by the support poles 34, 34, and a support pole 41b that stand on the float F. The guard 41 allows the movable member M to be partially exposed from the opening 41a, and inhibits the movable member M from excessively shifting upward due to the swinging motion of the float F.

Figure 4A:
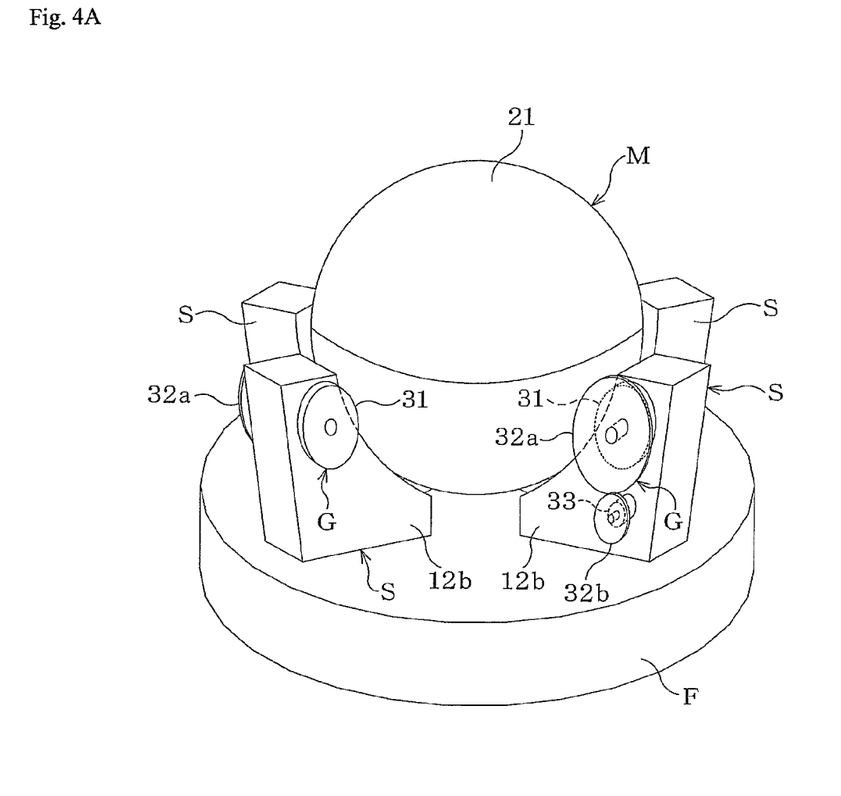
FIGS. 4A and 4B are fourth explanatory views each showing an entire structure.
Figure 4B:
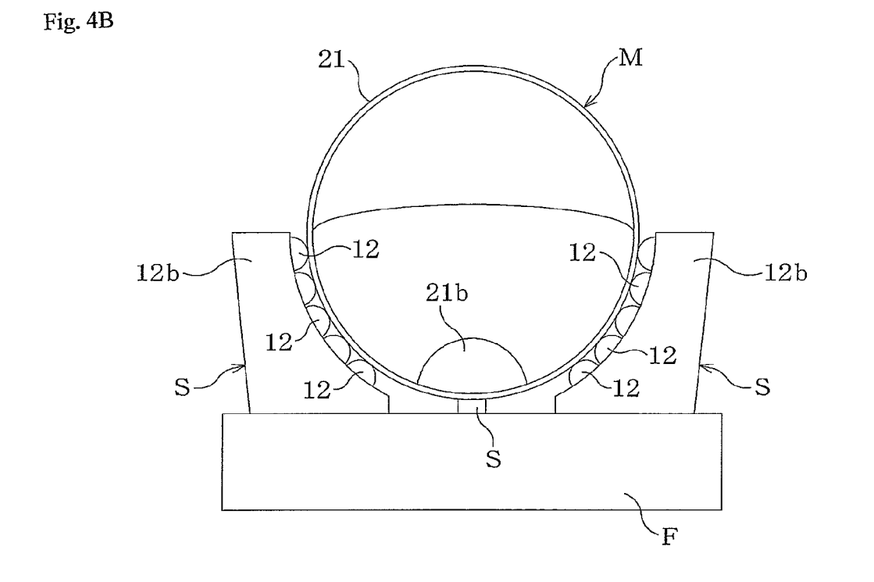

Alternatively, the movable member M provided as the spherical body 21 may be supported by the supporting members S, S, . . . each having a spherical bearing surface (FIGS. 4A and 4B). Similarly to FIGS. 1A and 1B, FIGS. 4A and 4B are a schematic perspective view of an entire structure, and a vertical sectional view at the center of the entire structure, respectively.

Each of the supporting members S includes a stand 12b that has a concave spherical surface to be fitted with the outer diameter of the movable member M, and a large number of supporting balls 12, 12, . . . each of which is rotatably embedded in the spherical surface of the stand 12b, so that the movable member M is rotatably supported by the supporting balls 12, 12, . . . In FIG. 4A, the power generation units G each include the roller 31 that is mounted to the stand 12b of the corresponding supporting member S so as to be in contact with the surface of the movable member M, the large and small gears 32a and 32b, and the dynamo 33.

Figure 5A:
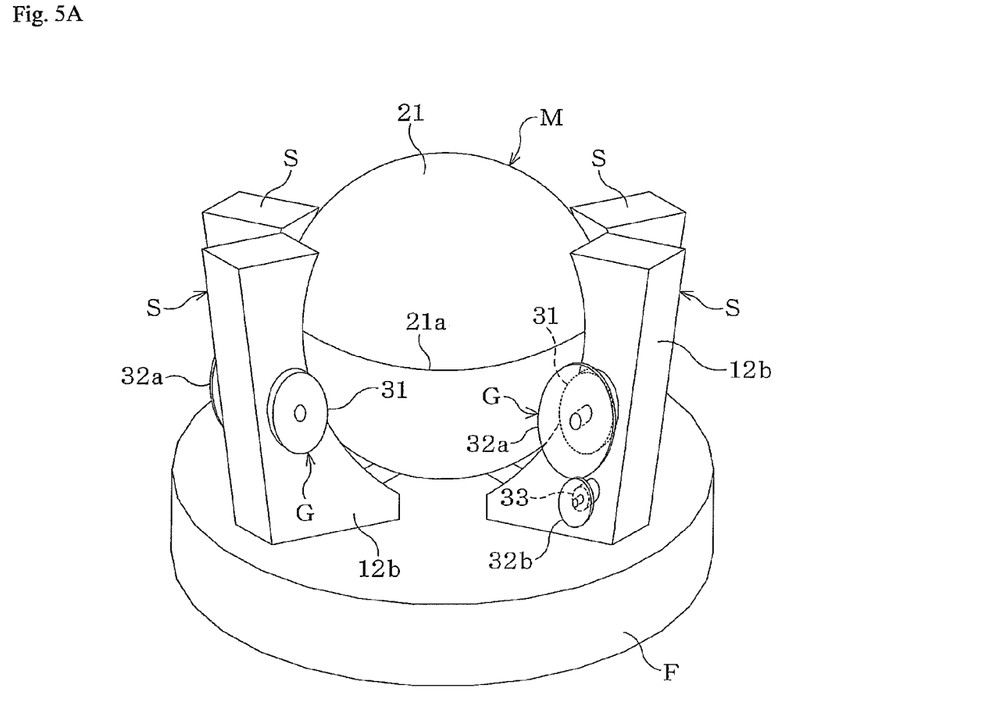
FIGS. 5A and 5B are fifth explanatory views each showing an entire structure.
Figure 5B:
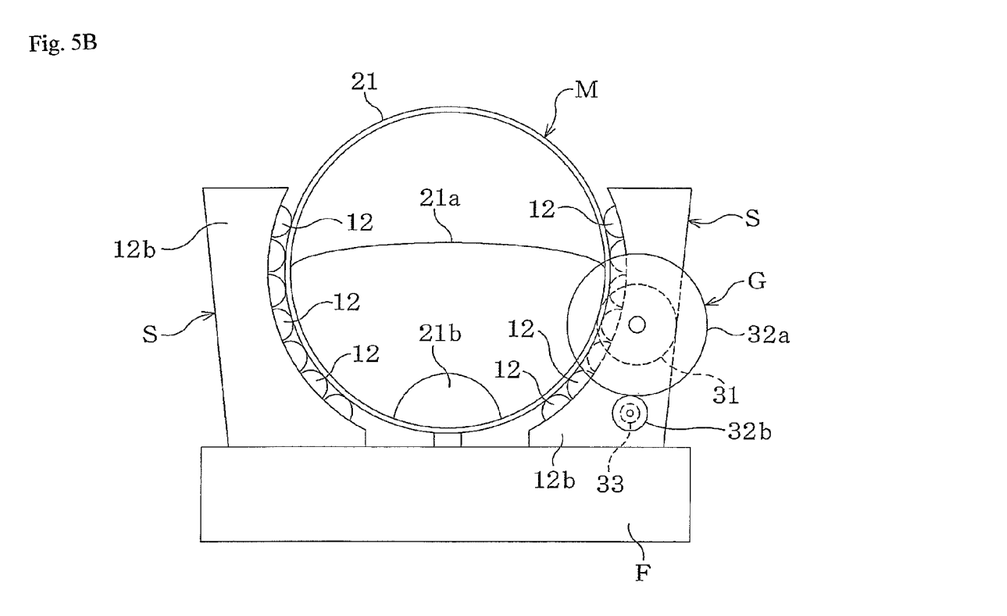

In each of the supporting members S in FIGS. 4A and 4B, the stand 12b having the concave spherical surface may be extended upward so as to be higher than the joint portion 21a at the center of the movable member M provided as the spherical body 21 (FIGS. 5A and 5B). In this configuration, the movable member M as the spherical body 21 can be retained more stably. Similarly to FIGS. 1A and 1B, FIGS. 5A and 5B are a schematic perspective view of an entire structure, and a vertical sectional view at the center of the entire structure, respectively. In FIGS. 1A to 5B, the movable member M as the spherical body 21 can be rotatably supported by the three or more supporting members S, S, . . .

Figure 6A:
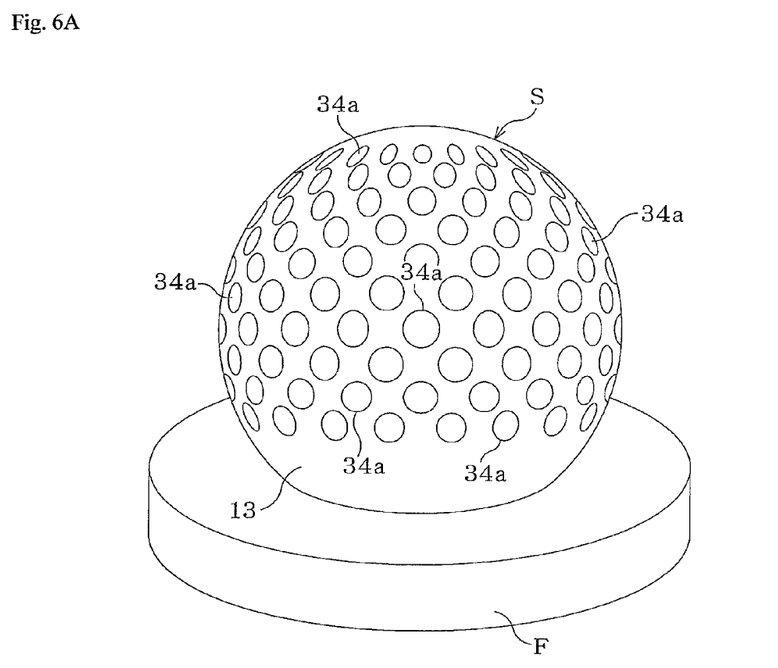
FIGS. 6A and 6B are sixth explanatory views each showing an entire structure.
Figure 6B:
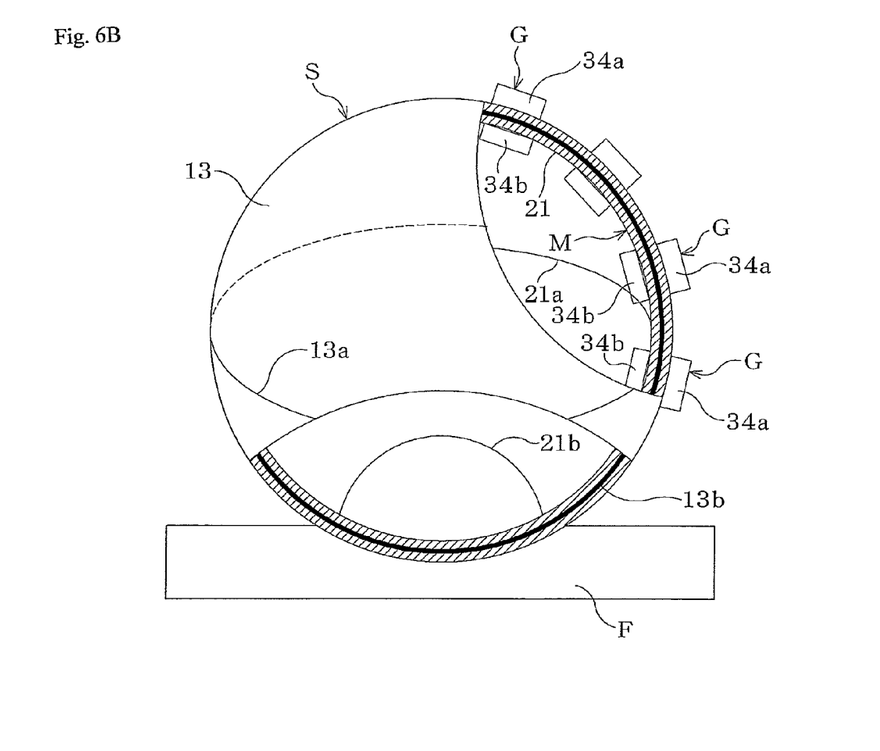

The movable member M provided as the spherical body 21 may be entirely accommodated in the supporting member S configured by a spherical shell 13 (FIGS. 6A and 6B). Similarly to FIGS. 1A and 1B, FIGS. 6A and 6B are a schematic perspective view of an entire structure, and a vertical sectional view at the center of the entire structure, respectively.

The spherical shell 13 can be separated into an upper portion and a lower portion at a central joint portion 13a, and is secured onto the float F. The spherical body 21 is accommodated in the spherical shell 13 so as to be relatively rotatable in arbitrary directions with a lubricant 13b such as oil being provided therebetween. The spherical shell 13 is provided on the outer surface with a large number of coils 34a, 34a, . . . that are distributed substantially all over the surface thereof. Further, the spherical body 21 is provided on the inner surface with a large number of magnets 34b, 34b, . . . that are distributed substantially all over the surface thereof. In this configuration, when the spherical body 21 is rotated randomly and relatively to the spherical shell 13, a magnetic flux of each of the magnets 34b interacts with the corresponding coil 34a and there is thus caused an electromotive force in each of the coils 34a. In this manner, the coils 34a and the magnets 34b configure the power generation units G, respectively.

Figure 7A:
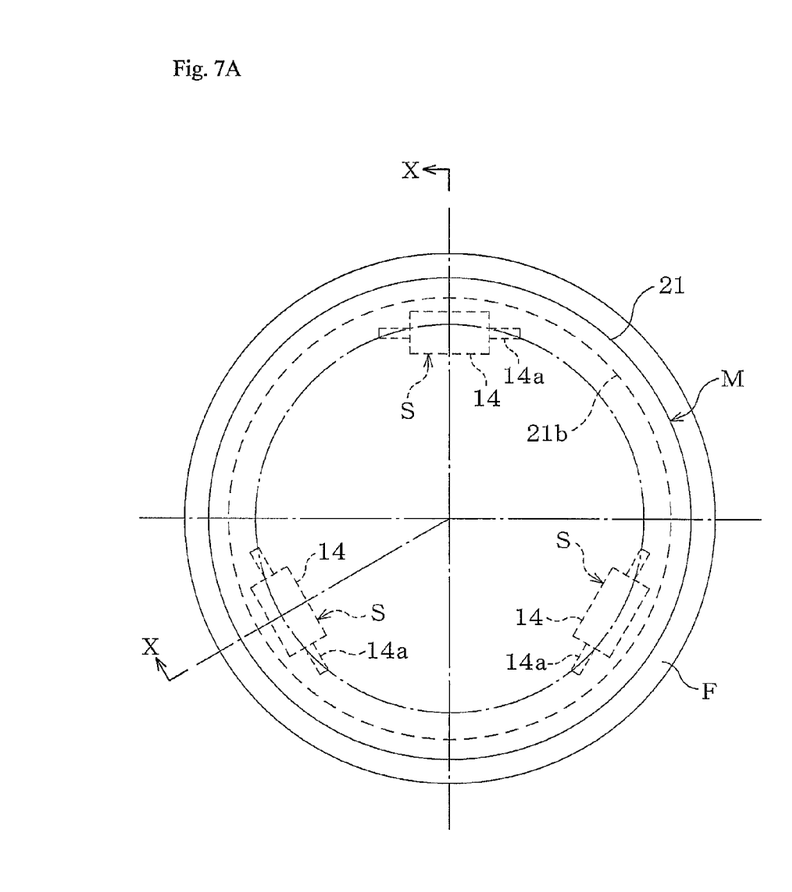
FIGS. 7A and 7B are seventh explanatory views each showing an entire structure.
Figure 7B:
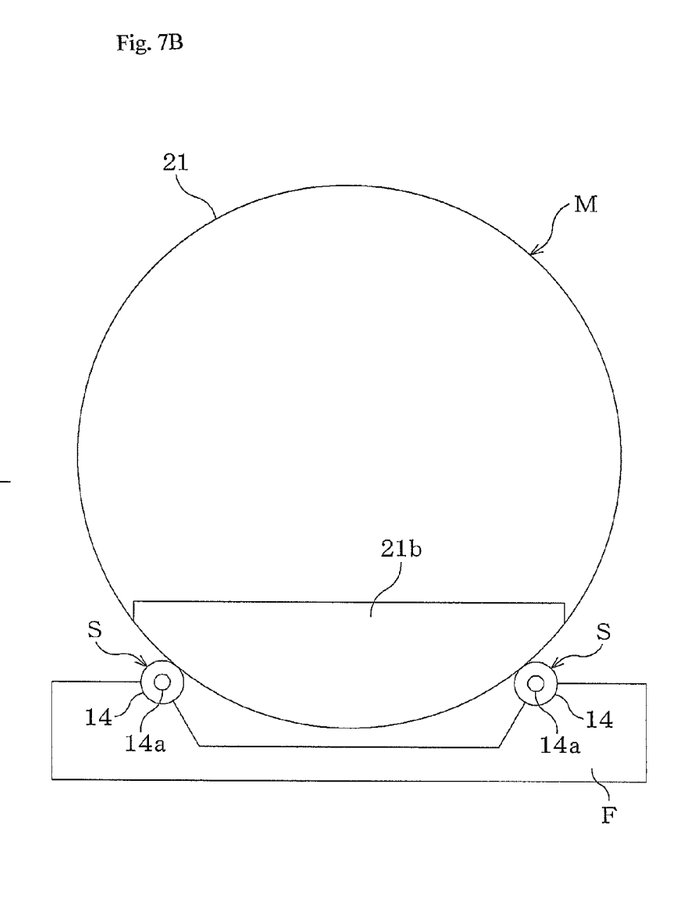

The movable member M as the spherical body 21 may be rotatably supported by the three supporting members S, S, S that are configured by supporting rollers 14, 14, 14 arranged in a horizontal plane (FIGS. 7A and 7B). FIG. 7A is a top view of an entire structure, and FIG. 7B is a sectional view taken along line X-X and seen in the directions of arrows thereof.

Each of the supporting rollers 14, 14, 14 is integrally rotatable with a corresponding horizontal rotary shaft 14a provided on the float F, and is also movable in the axial direction of the rotary shaft 14a. Each of the rotary shafts 14a is connected with the dynamo of the power generation unit G (not shown). In this configuration, when the float F swings, the movable member M provided as the spherical body 21 is rotated randomly and reciprocatingly on the supporting rollers 14, 14, 14 to rotate the supporting rollers 14 and the rotary shafts 14a, so that electric power is generated by the power generation units G, G, G.

Figure 8A:
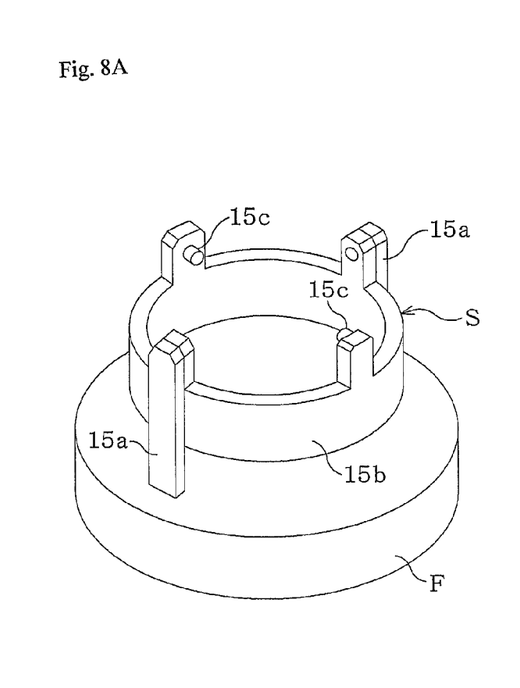
FIGS. 8A, 8B and 8C are eighth explanatory views each showing an entire structure.
Figure 8B:
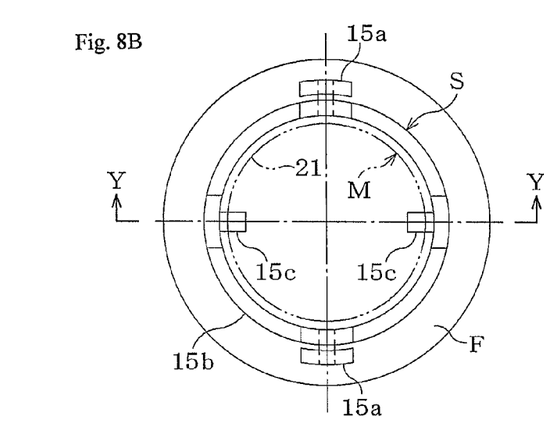
Figure 8C:
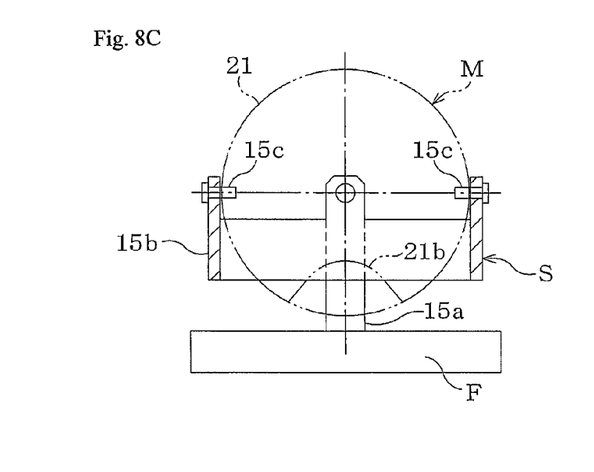

The movable member M provided as the spherical body 21 may be rotatably supported by the supporting member S that is configured by a biaxial gimbal mechanism (FIGS. 8A to 8C). FIG. 8A is a schematic perspective view of an entire structure, FIG. 8B is a top view of the entire structure, and FIG. 8C is a sectional view taken along line Y-Y and seen in the direction of arrows thereof. The movable member M is not shown in FIG. 8A.

The supporting member S includes a pair of support poles 15a, 15a standing on the float F, a ring 15b attached to the upper ends of the support poles 15a, 15a so as to be swingable rightward and leftward, and horizontal shafts 15c, 15c provided on the ring 15b so as to face each other. The movable member M is attached so as to be relatively rotatable about the horizontal shafts 15c, 15c, and is swingable inside the ring 15b in the directions perpendicular to the swinging directions of the ring 15b. Each of the horizontal shafts 15c is connected with the dynamo of the power generation unit G (not shown). In this configuration, when the float F swings upward, downward, rightward, and leftward, the movable member M is randomly rotated in arbitrary directions via the supporting member S configured by the gimbal mechanism, so that electric power is generated by the power generation units G, G.

Figure 9:
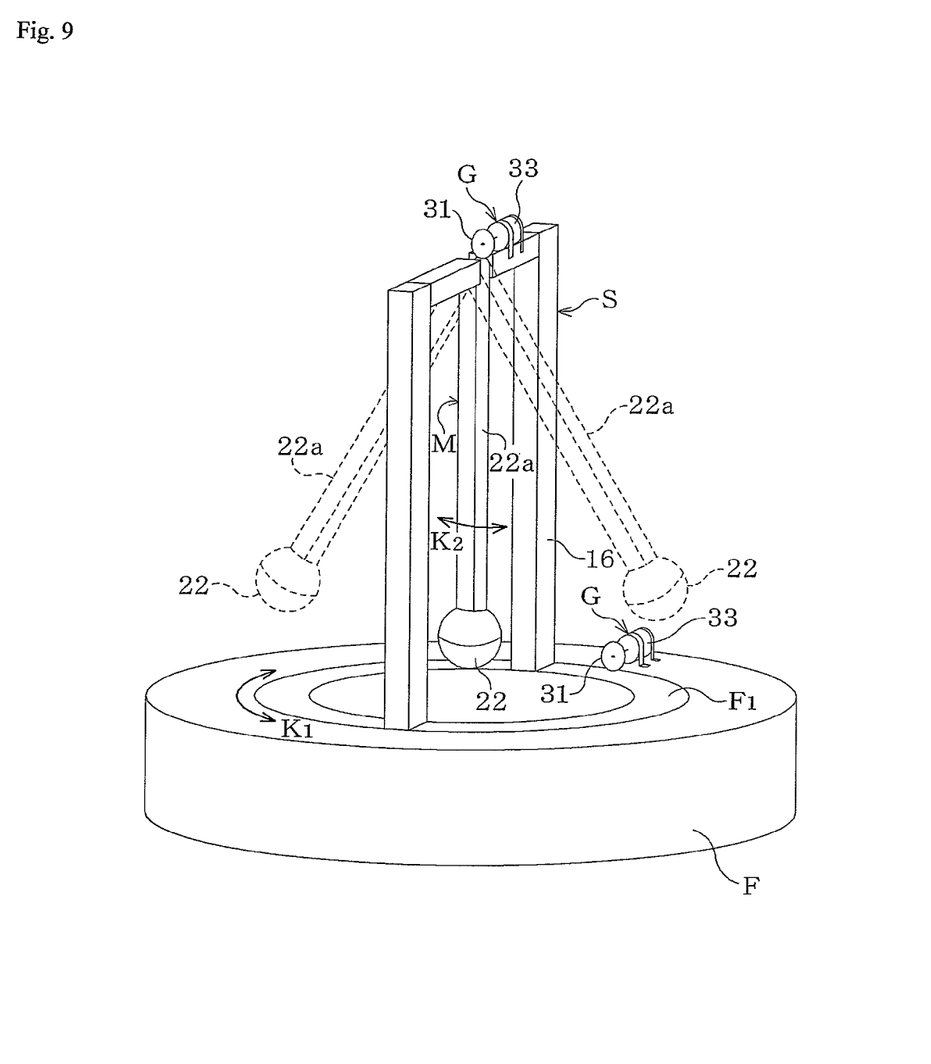
FIG. 9 is ninth explanatory views each showing an entire structure.

Alternatively, the movable member M may be embodied as a swinging member 22 that swings reciprocatingly within a vertical plane (FIG. 9).

The swinging member 22 is a weight serving as a simple pendulum provided with a rigid hanging member 22a, and is hung, so as to be swingable forward and backward, from the supporting member S configured by a support 16 that has a shape of a gate and stands on the float F. It is noted that the support 16 stands on a turntable F1 embedded in the float F. Disposed on the support 16 is the power generation unit G that has the dynamo 33 provided with the roller 31 for rotating in association with the swinging motion of the hanging member 22a. There is provided on the float F another power generation unit G that has a dynamo 33 provided with a roller 31 for rotating in association with the rotation of the turntable F1.

When the float F on the surface of the sea is swung upward, downward, rightward, and leftward by waves, the turntable F1 rotates clockwise and counterclockwise (in the directions indicated by an arrow K1 in FIG. 9) and the swinging member 22 swings forward and backward (as illustrated by solid lines and dotted lines, in the directions indicated by an arrow K2 in FIG. 9). Accordingly, the power generation units G, G can generate electric power with use of the swinging motion of the swinging member 22 and the rotation of the turntable F1, respectively.

Figure 10A:
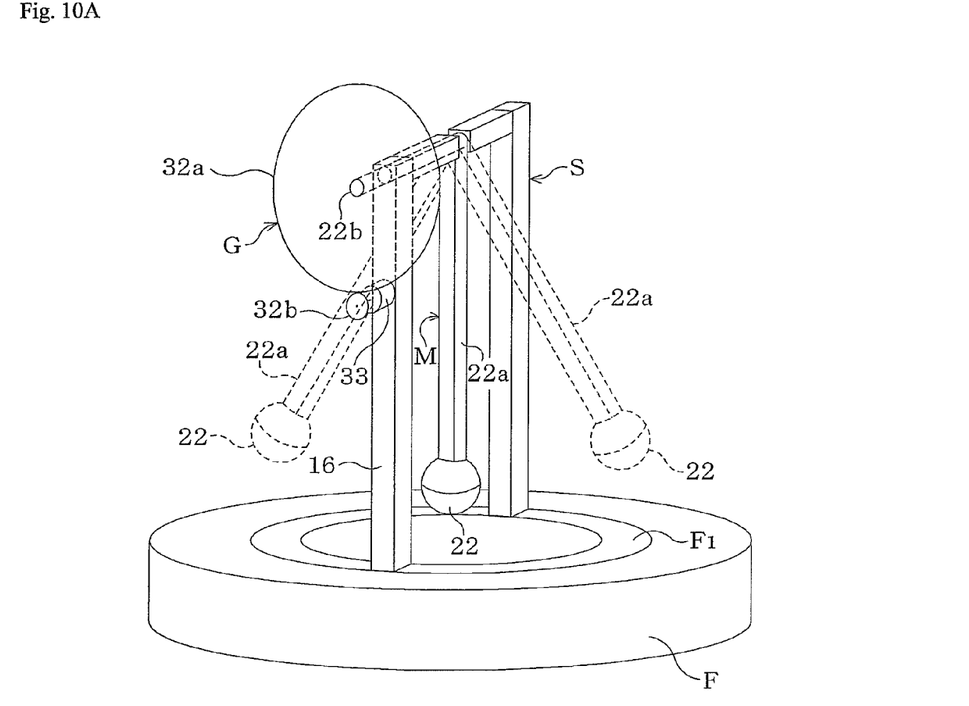
FIGS. 10A and 10B are tenth explanatory views each showing an entire structure.
Figure 10B:
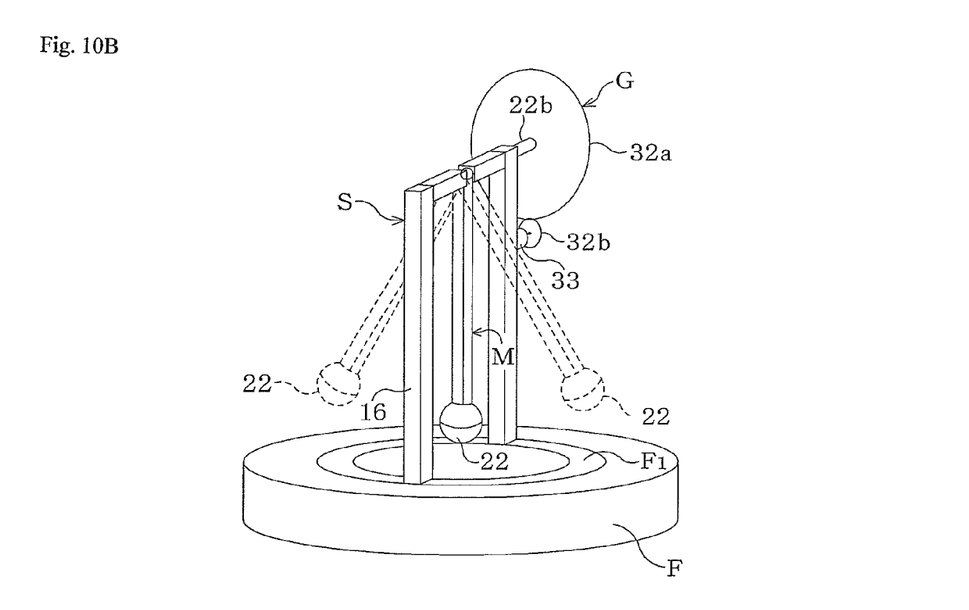

The power generation unit G provided on the support 16 in FIG. 9 may include an auxiliary shaft 22b that is coupled to the upper end of the hanging member 22a of the swinging member 22 and projects from the support 16 in one direction (FIGS. 10A and 10B), and the auxiliary shaft 22b may be connected to the dynamo 33 by way of the large and small gears 32a and 32b. FIGS. 10A and 10B are schematic perspective views of an entire structure seen in the directions opposite from each other. In FIGS. 9, 10A, and 10B, the swinging member 22 in combination with the hanging member 22a may be changed into an arbitrary shape such as a flat plate.

Figure 11A:
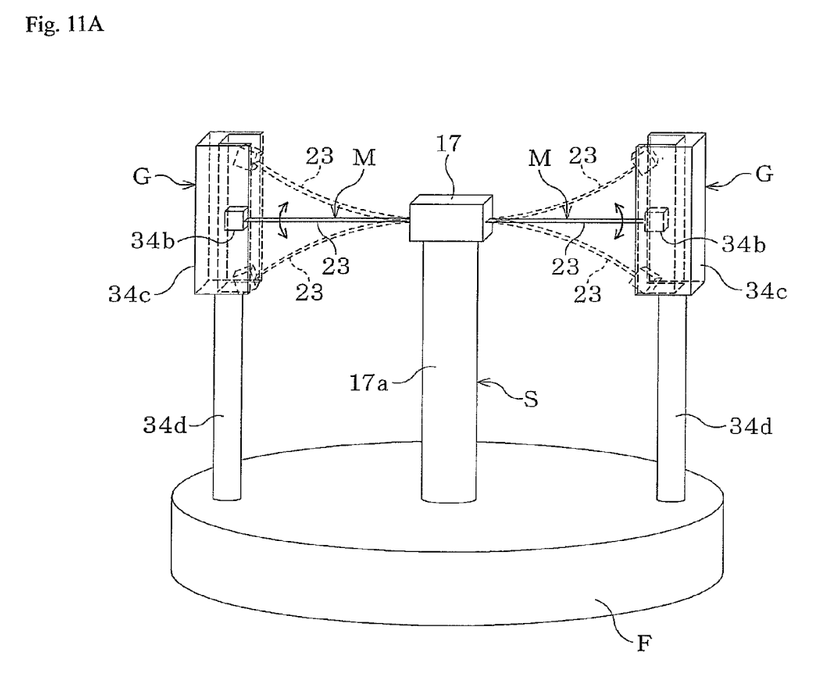
FIGS. 11A, 11B and 11C are eleventh explanatory views each showing an entire structure.

Further alternatively, the movable member M may be embodied as vibrating members 23 each of which vibrates reciprocatingly within a vertical plane (FIG. 11A).

The vibrating members 23, 23 are configured by spring members or the like, and each have one end secured to a bracket 17 at the upper end of a support pole 17a so as to project horizontally in opposite directions. The support pole 17a stands on the float F and configures, in combination with the bracket 17, the supporting member S that supports the movable members M, M.

Figure 11B:
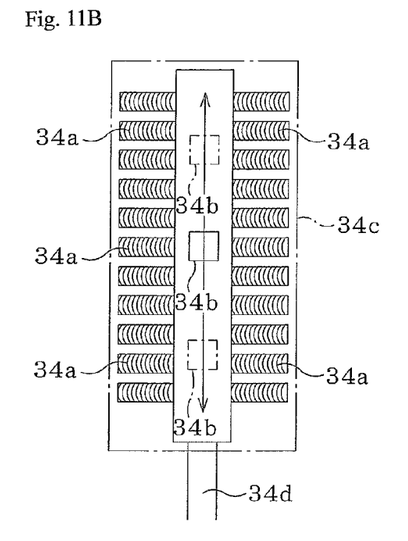
Figure 11C:
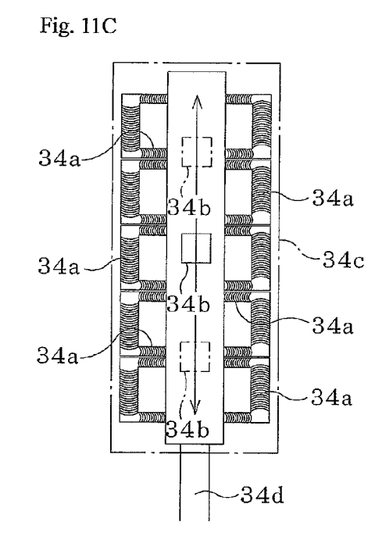

Each of the vibrating members 23 is provided with the magnet 34b that is secured to the distal end thereof, and each of the magnets 34b is movable upward and downward in a corresponding coil case 34c. Each of the coil cases 34c is supported on a support pole 34d that stands on the float F, and accommodates a large number of coils 34a, 34a, . . . that are aligned orderly along the vertical shifting route of the corresponding magnet 34b, as shown in FIG. 11B or 11C, for example.

When the float F is swung upward, downward, rightward, and leftward by waves, the movable members M, M provided as the vibrating members 23, 23 swing upward and downward (as illustrated by solid lines and dotted lines, in the directions indicated by arrows in FIG. 11A). In this case, each of the magnets 34b provided at the distal end of the corresponding vibrating member 23 is reciprocatingly shifted upward and downward within the corresponding coil case 34c (as illustrated by solid lines and single dashed chain lines, in the directions indicated by an arrow in FIG. 11B or 11C). Then, a magnetic flux of each of the magnets 34b interacts with the corresponding coils 34a, 34a, . . . to generate electric power.

Figure 12:
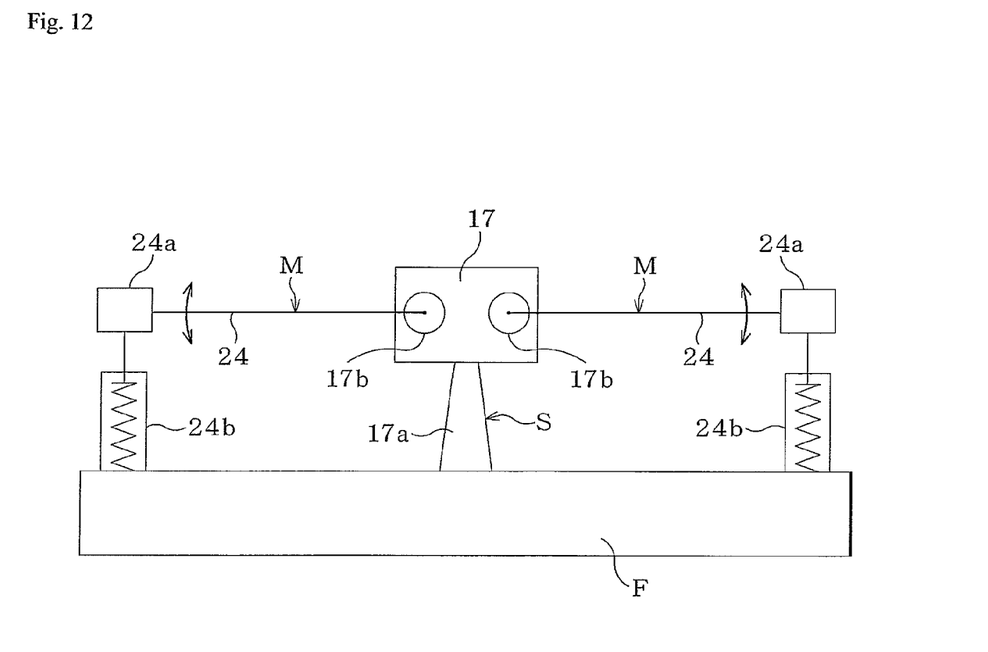
FIG. 12 is twelfth explanatory views each showing an entire structure.

The movable members M may be embodied as vibrating members 24, 24 that are respectively configured by rigid arms, in place of the vibrating members 23, 23 configured by the spring members in FIG. 11A (FIG. 12).

The vibrating members 24, 24 each have a proximal end that is connected to the bracket 17 by way of a corresponding bearing 17b so as to be rotatable upward and downward with respect to the bracket 17. Further, the vibrating members 24, 24 each have a distal end to which a corresponding weight 24a is secured, and the weight 24a is elastically supported by a corresponding compression spring 24b on the float F. In this configuration, when the float F swings upward, downward, rightward, and leftward, the vibrating members 24, 24 are vibrated upward and downward (in the directions indicated by arrows in FIG. 12), and electric power can be generated by the power generation units G, G (not shown) that are connected to a shaft penetrating the bearings 17b, 17b. In FIGS.

11A to 11C and 12, a large number of movable members M may be radially displaced around the support pole 17a of the supporting member S.

Figure 13A:
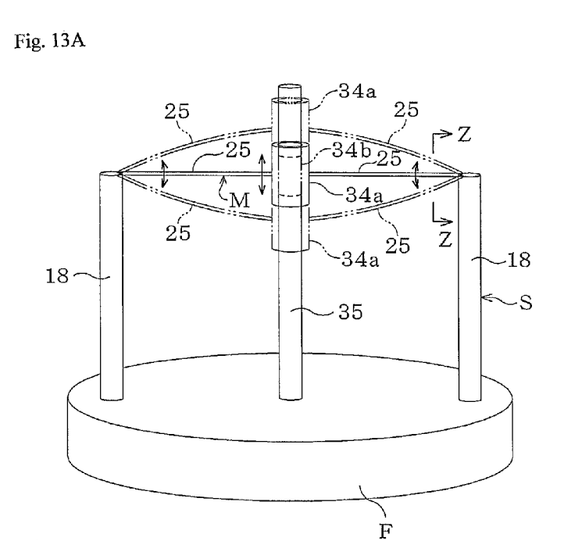
FIGS. 13A, 13B, 13C and 13D are thirteenth explanatory views each showing an entire structure.
Figure 13B:
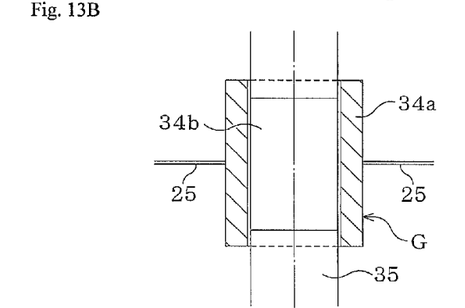
Figure 13C:
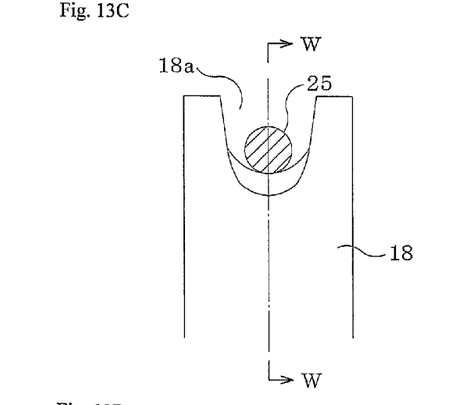
Figure 13D:
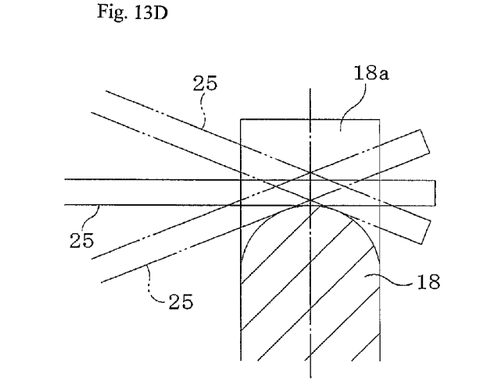

The movable members M may be configured by a pair of vibrating members 25, 25 that are supported by the supporting members S provided as support poles 18, 18 standing on the float F (FIGS. 13A to 13D). FIG. 13A is a schematic perspective view of an entire structure, FIG. 13B is an enlarged sectional view of a main portion, FIG. 13C is an enlarged sectional view taken along line Z-Z of FIG. 13A and seen in the direction of arrows, and FIG. 13D is a sectional view taken along line W-W of FIG. 13B and seen in the direction of arrows.

The vibrating members 25, 25 are configured by spring members that project respectively from the cylindrical coil 34a in opposite directions, and each have a distal end fitted in a U-letter shaped groove 18a at the upper end of the corresponding support pole 18. The U-letter shaped groove 18a has a bottom surface in a chevron shape in cross section in the longitudinal direction of the vibrating members 25. The cylindrical coil 34a allows a support pole 35 standing on the float F to penetrate in the vertical direction, and the support pole 35 is provided at an intermediate portion with the magnet 34b that configures the power generation unit G in combination with the coil 34a.

The swinging motion of the float F vibrates the vibrating members 25, 25 upward and downward (as illustrated by solid lines and double dashed chain lines, in the directions indicated by arrows in FIG. 13A), and the coil 34a is thus reciprocatingly shifted upward and downward along the support pole 35. In this case, a magnetic flux of the magnet 34b interacts with the coil 34a, and electric power can be generated by the power generation unit G.

Figure 14A:
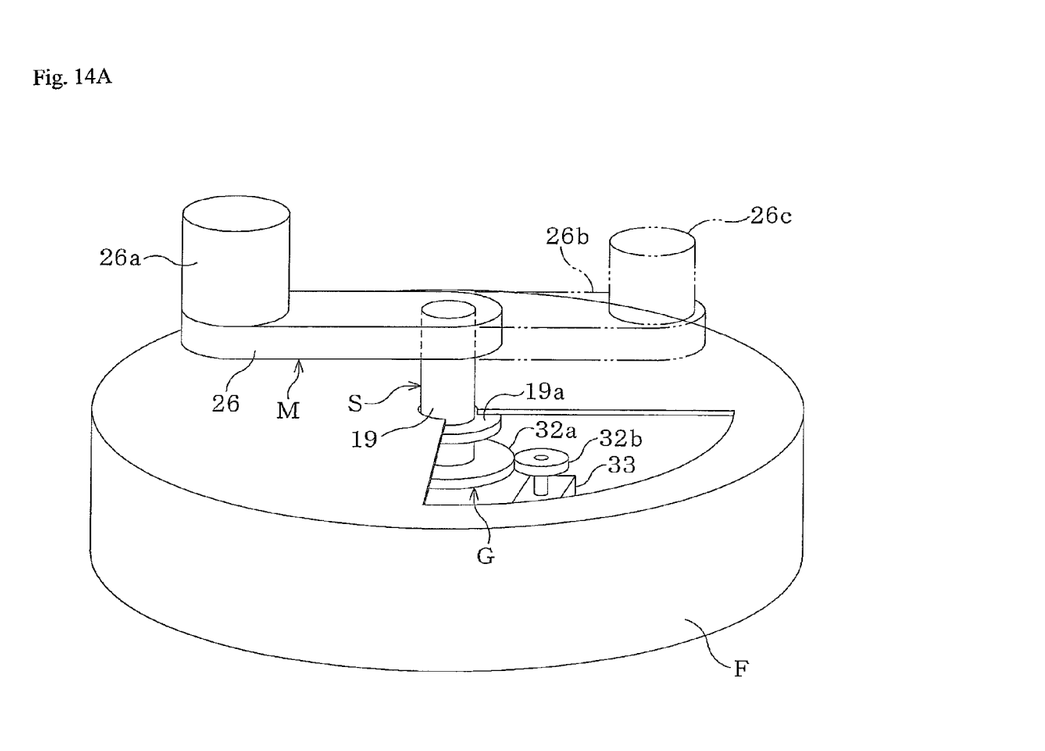
FIGS. 14A and 14B are fourteenth explanatory views each showing an entire structure.
Figure 14B:
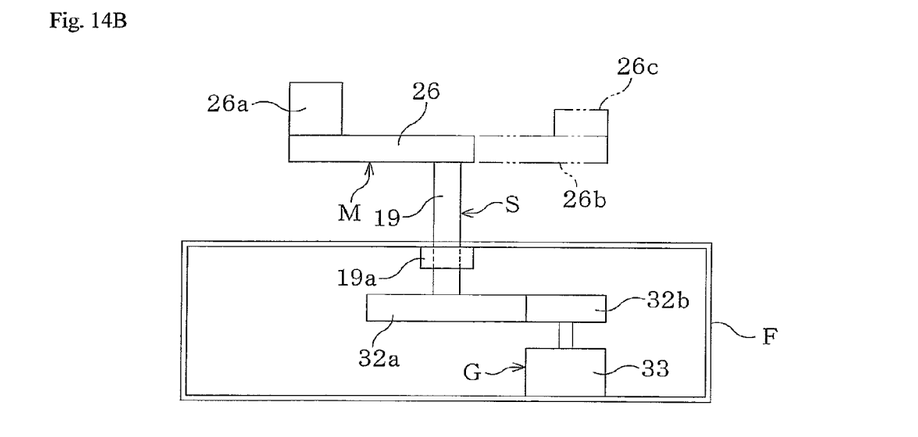

The movable member M may be embodied as a rotating member 26 that is supported by a rotary shaft 19 serving as the supporting member S (FIGS. 14A and 14B). Similarly to FIGS. 1A and 1B, FIGS. 14A and 14B are a schematic perspective view of an entire structure, and a vertical sectional view at the center of the entire structure, respectively. In FIG. 14A, the float F is illustrated while being partially cut out.

The rotating member 26 is secured to the upper end of the rotary shaft 19 extending upward. There is secured a weight 26a to the distal end of the rotating member 26. The rotary shaft 19 is rotatably supported by a bearing 19a that is provided in the float F, and is connected to the dynamo 33 of the power generation unit G by way of the large and small gears 32a and 32b. The power generation unit G and the bearing 19a are collectively accommodated in the hollow float F. In this configuration, when the float F swings, the rotating member 26 is rotated within a horizontal plane that is in parallel with the float F, so that electric power can be generated by the power generation unit G. This is because the weight 26a sufficiently dislocates the center of gravity of the rotating member 26 from the rotary shaft 19.

In FIGS. 14A and 14B, in a case where there is provided an auxiliary rotating member 26b that has a weight 26c and is located symmetrically with the rotating member 26 (double dashed chain lines in each of FIGS. 14A and 14B), the rotation of the rotating member 26 does not excessively affect the balance of the float F. However, assume that the center of gravity in common between the rotating member 26 and the auxiliary rotating member 26b is still dislocated from the rotary shaft 19 even in the case where the weight 26c is provided. Alternatively, the rotating member 26 and the auxiliary rotating member 26b may be embodied as an integral circular plate.

Each of the movable members M provided as the spherical bodies 21 shown in FIGS. 1A to 8C is retained by the supporting members S, S, ... so as to be reciprocatingly rotatable in arbitrary directions about the center thereof. Thus, each of the movable members M operates as a spherical pendulum. The movable members M configured by the swinging members 22 shown in FIGS. 9, 10A, and 10B, and the movable members M configured by the vibrating members 23, 23 and the vibrating members 24, 24 shown in FIGS. 11A and 12 each operate as a simple pendulum that reciprocatingly moves within a certain vertical plane perpendicular to the corresponding float F.

As having been described, the float F may be formed into the circular plate shape, or a rectangular shape, optionally having a sharpened portion at one or each end thereof, for example, so as to easily face the travel direction of waves. Instead of the flat plate shape, the float F may be embodied as a hollow container that is capable of accommodating partially or entirely the parts mounted on the upper surface thereof. The float F preferably has a maximum dimension substantially equivalent to a fraction of the average height of waves, for example, so as to be easily swung by waves. Further, the float F is desirably used while being loosely anchored only at one point. The power generator according to the present invention may be independently used on the surface of the sea. Alternatively, the several power generators may be connected in series so that the line of the power generators is bendable upward, downward, rightward, and leftward.

The float F serving as the base member may be used as a base to be mounted on an arbitrary structural body that can function as a vibration source or a swing source such as a land vehicle, a boat or a buoy on the water. Electric power can be generated with use of the vibrating motion or the swinging motion of such a structural body.

The present invention is preferably and widely applicable as a power generator of low capacitance, which is used as a power source for a beacon, a buoy provided with lighting, or the like to be placed on the surface of the sea. Further, the power generator according to the present invention is applicable to the cases of being mounted on a vehicle or the like so as to be used for generating electric power with use of the vibrating motion or the swinging motion of the vehicle or the like.

What is claimed is:

1. A power generator comprising: a base member;
   a supporting member mounted on the base member;
   a movable member supported by the supporting member, and being configured to move in association with the base member; and
   a power generation unit configured to generate electric power from the motion of the movable member, wherein the movable member is a spherical body, and a weight is secured to the inside of the spherical body, the weight dislocates the center of gravity of the spherical body.

2. The power generator according to claim 1, wherein the movable member is a vibrating member that is configured to reciprocatingly vibrate within a vertical plane.

3. The power generator according to claim 1, wherein the movable member is a swinging member that is configured to reciprocatingly swing within a vertical plane.

4. The power generator according to claim 1, wherein the movable member is a rotating member that is configured to rotate within a horizontal plane.

5. The power generator according to claim 1, wherein the spherical body has an inner spherical surface and the weight is fixed to the inner spherical surface.

6. The following is an examiner's statement of reasons for allowance: the prior art fails to provide, teach or suggest the movable member is a spherical body, and a weight is secured to the inside of the spherical body, the weight dislocates the center of gravity of the spherical body; and in combination with other limitations in claim 1.

7. The power generator according to claim 6, wherein the movable member is a vibrating member that is configured to reciprocatingly vibrate within a vertical plane.

8. The power generator according to claim 6, wherein the movable member is a swinging member that is configured to reciprocatingly swing within a vertical plane.

9. The power generator according to claim 6, wherein the movable member is a rotating member that is configured to rotate within a horizontal plane.

* * * * *